(12) United States Patent
Vollbrecht et al.

(10) Patent No.: US 10,810,903 B2
(45) Date of Patent: Oct. 20, 2020

(54) COMPUTERIZED METHOD OF DETECTING AND DEPICTING A TRAVEL PATH OF A GOLF BALL

(71) Applicant: FLYINGTEE TECH, LLC, Jenks, OK (US)

(72) Inventors: James Vollbrecht, Jenks, OK (US); Jeremy Mathew Carver, Salt Lake City, UT (US)

(73) Assignee: FLYINGTEE TECH, LLC, Jenks, OK (US)

(*) Notice: Subject to any disclaimer, the term of this patent is extended or adjusted under 35 U.S.C. 154(b) by 0 days.

(21) Appl. No.: 15/480,350

(22) Filed: Apr. 5, 2017

(65) Prior Publication Data

US 2018/0290041 A1 Oct. 11, 2018

(51) Int. Cl.
*G09B 19/00* (2006.01)
(52) U.S. Cl.
CPC ................ *G09B 19/0038* (2013.01)
(58) Field of Classification Search
CPC ........ A63B 24/0021; A63B 2024/0031; A63B 2024/0034; A63B 2024/004; A63B 2220/12; A63B 2220/30; A63B 2220/35; A63B 2220/53; A63B 69/3694; A63B 71/0619; A63B 71/0622
See application file for complete search history.

(56) References Cited

U.S. PATENT DOCUMENTS

| 37,122,624 | | 1/1973 | Conklin |
| 4,137,566 A | | 1/1979 | Haas et al. |
| 4,283,056 A | | 8/1981 | Miller |
| 4,343,469 A | | 8/1982 | Kunita et al. |
| 4,673,183 A | | 6/1987 | Trahan |
| 4,836,551 A | * | 6/1989 | LaSalle ............ A63B 24/0021 473/152 |
| 5,092,602 A | | 3/1992 | Witler et al. |
| 5,150,895 A | | 9/1992 | Berger |
| 5,246,232 A | | 9/1993 | Eccher et al. |

(Continued)

FOREIGN PATENT DOCUMENTS

| CA | 2839362 | 10/2012 |
| KR | 100923452 | 10/2009 |

(Continued)

OTHER PUBLICATIONS

Search Report for PCT Application No. PCT/US2014/045106 dated Nov. 7, 2014.

(Continued)

*Primary Examiner* — Paul A D'Agostino
(74) *Attorney, Agent, or Firm* — Crowe & Dunlevy, P.C.

(57) ABSTRACT

A computerized method of detecting and depicting a travel path of a golf ball hit from a hitting station in a plurality of hitting stations at a driving range. The computerized method utilizes a plurality of sensors to detect shot launch parameters from a first field of detection, shot trajectory parameters from a second field of detection, and/or ground path parameters from a third field of detection. Because the sensors may detect similar parameters from the overlapping fields of detection, the computerized method determines which parameters should be utilized to calculate and depict the travel path of the golf ball on a display.

21 Claims, 6 Drawing Sheets

(56) References Cited

U.S. PATENT DOCUMENTS

| | | | |
|---|---|---|---|
| 5,290,037 A | 3/1994 | Witler et al. | |
| 5,303,924 A | 4/1994 | Kluttz et al. | |
| 5,342,051 A | 8/1994 | Rankin et al. | |
| 5,375,832 A | 12/1994 | Witler et al. | |
| 5,398,936 A | 3/1995 | Kluttz et al. | |
| 5,401,026 A | 3/1995 | Eccher et al. | |
| 5,413,345 A | 5/1995 | Nauck | |
| 5,486,002 A | 1/1996 | Witler et al. | |
| 5,489,099 A | 2/1996 | Rankin et al. | |
| 5,653,642 A | 8/1997 | Bonacorsi | |
| 5,697,791 A * | 12/1997 | Nashner | A63B 24/0003 |
| | | | 434/247 |
| 5,700,204 A | 12/1997 | Teder | |
| 5,743,815 A | 4/1998 | Helderman | |
| 5,820,496 A | 10/1998 | Bergeron | |
| 5,879,246 A | 3/1999 | Gebhardt et al. | |
| 5,938,545 A | 8/1999 | Cooper et al. | |
| 6,012,987 A | 1/2000 | Nation | |
| 6,179,720 B1 | 1/2001 | Rankin et al. | |
| 6,217,444 B1 | 4/2001 | Kataoka et al. | |
| 6,304,665 B1 | 10/2001 | Cavallaro et al. | |
| 6,320,173 B1 | 11/2001 | Vock et al. | |
| 6,322,455 B1 | 11/2001 | Howey | |
| 6,371,862 B1 | 4/2002 | Reda | |
| 6,373,508 B1 | 4/2002 | Moengen | |
| 6,409,607 B1 | 6/2002 | Libit et al. | |
| 6,437,559 B1 | 8/2002 | Zajac et al. | |
| 6,449,382 B1 | 9/2002 | Ciccolo et al. | |
| 6,520,864 B1 | 2/2003 | Wilk | |
| 6,547,671 B1 | 4/2003 | Mihran | |
| 6,569,028 B1 * | 5/2003 | Nichols | A63B 69/3694 |
| | | | 473/153 |
| 6,607,123 B1 | 8/2003 | Jolliffe et al. | |
| 6,702,292 B2 | 3/2004 | Takowsky | |
| 6,764,412 B2 | 7/2004 | Gobush et al. | |
| 6,781,621 B1 | 8/2004 | Gobush et al. | |
| 6,898,971 B2 | 5/2005 | Dilz, Jr. | |
| 6,905,339 B2 | 6/2005 | DiMare et al. | |
| 6,974,391 B2 | 12/2005 | Ainsworth et al. | |
| 6,998,965 B1 | 2/2006 | Luciano, Jr. et al. | |
| 7,040,998 B2 | 5/2006 | Jolliffe et al. | |
| 7,052,391 B1 | 5/2006 | Luciano, Jr. | |
| 7,059,974 B1 | 6/2006 | Golliffe et al. | |
| 7,094,164 B2 | 8/2006 | Marty et al. | |
| 7,095,312 B2 | 8/2006 | Erario et al. | |
| 7,143,639 B2 | 12/2006 | Gobush | |
| 7,160,196 B2 | 1/2007 | Thirkettle et al. | |
| 7,214,138 B1 | 5/2007 | Stivers et al. | |
| 7,223,169 B2 | 5/2007 | Imaeda et al. | |
| 7,317,388 B2 | 1/2008 | Kawabe et al. | |
| 7,321,330 B2 | 1/2008 | Takahiro | |
| 7,337,965 B2 | 3/2008 | Thirkettle et al. | |
| 7,344,446 B2 | 3/2008 | Wyeth | |
| 7,497,780 B2 | 3/2009 | Kiraly | |
| 7,641,565 B2 | 1/2010 | Kiraly | |
| 7,787,886 B2 | 8/2010 | Markhovsky et al. | |
| 7,815,516 B1 | 10/2010 | Mortimer et al. | |
| 7,822,424 B2 | 10/2010 | Markhovsky et al. | |
| 7,837,572 B2 | 11/2010 | Bissonnette et al. | |
| 7,843,429 B2 | 11/2010 | Pryor | |
| 7,854,669 B2 | 12/2010 | Marty et al. | |
| 8,018,375 B1 | 9/2011 | Alexopoulos et al. | |
| 8,068,095 B2 | 11/2011 | Pryor | |
| 8,077,917 B2 | 12/2011 | Forsgren | |
| 8,113,964 B2 | 2/2012 | Lindsay | |
| 8,142,302 B2 | 3/2012 | Balardeta et al. | |
| 8,257,189 B2 | 9/2012 | Koudele et al. | |
| 8,328,653 B2 | 12/2012 | Lock | |
| 8,335,345 B2 | 12/2012 | White et al. | |
| 83,354,345 | 12/2012 | White et al. | |
| 8,400,346 B2 | 3/2013 | Hubbard et al. | |
| 8,409,024 B2 | 4/2013 | Marty et al. | |
| 8,550,819 B2 | 10/2013 | Anderson | |
| 8,908,922 B2 * | 12/2014 | Marty | G06T 7/246 |
| | | | 382/103 |
| 8,912,945 B2 | 12/2014 | Tuxen | |
| 8,948,457 B2 | 2/2015 | Marty et al. | |
| 2002/0107078 A1 | 8/2002 | Collins | |
| 2003/0103684 A1 * | 6/2003 | Gobush | A63B 24/0003 |
| | | | 382/286 |
| 2005/0012023 A1 | 1/2005 | Vock et al. | |
| 2007/0078018 A1 | 4/2007 | Kellogg et al. | |
| 2007/0167247 A1 | 7/2007 | Lindsay | |
| 2007/0293331 A1 | 12/2007 | Tuxen | |
| 2008/0021651 A1 | 1/2008 | Seeley et al. | |
| 2008/0039222 A1 | 2/2008 | Kiraly | |
| 2008/0139330 A1 | 6/2008 | Tuxen | |
| 2008/0261711 A1 | 10/2008 | Tuxen | |
| 2009/0036237 A1 | 2/2009 | Nipper | |
| 2009/0082122 A1 * | 3/2009 | Kellogg | A63B 69/3614 |
| | | | 473/222 |
| 2009/0253526 A1 | 10/2009 | Koudele et al. | |
| 2009/0295624 A1 | 12/2009 | Tuxen | |
| 2010/0137079 A1 | 6/2010 | Burke et al. | |
| 2011/0230986 A1 | 9/2011 | Lafortune et al. | |
| 2011/0286632 A1 | 11/2011 | Tuxen et al. | |
| 2012/0008825 A1 | 1/2012 | Casamona et al. | |
| 2012/0068879 A1 | 3/2012 | Tuxen | |
| 2013/0039538 A1 | 2/2013 | Johnson et al. | |
| 2013/0084930 A1 | 4/2013 | Chang et al. | |
| 2013/0184089 A1 | 7/2013 | Rauchholz et al. | |
| 2013/0196783 A1 * | 8/2013 | Kamino | A63F 7/0628 |
| | | | 473/222 |
| 2013/0274025 A1 | 10/2013 | Luciano, Jr. et al. | |
| 2016/0059072 A1 | 3/2016 | Vollbrecht et al. | |
| 2017/0239521 A1 * | 8/2017 | Packard | A63B 63/00 |

FOREIGN PATENT DOCUMENTS

| | | |
|---|---|---|
| KR | 1020090105279 | 10/2009 |
| KR | 1020120078462 | 7/2012 |
| WO | 2007037705 | 4/2007 |
| WO | 2011065804 | 6/2011 |
| WO | 2016036351 | 3/2016 |

OTHER PUBLICATIONS

Search Report for PCT Application No. PCT/US2014/053728 dated Dec. 23, 2014.

International Search Report and Written Opinion for PCT Application No. PCT/US2018/023752 dated Jul. 10, 2018.

* cited by examiner

COMPUTERIZED METHOD OF DETECTING AND DEPICTING A TRAVEL PATH OF A GOLF BALL

BACKGROUND OF THE INVENTION

1. Field of the Invention

The invention relates generally to the field of tracking golf balls, and more particularly, but not by way of limitation, to methods for using a plurality of sensors to facilitate the tracking and depiction of that path on a display.

2. Description of the Related Art

The game of golf has remained a popular hobby and recreational activity since it was invented several centuries ago. Part of the popularity of golf comes from pursuing mastery of its various skills. Improving such skills requires frequent and consistent practice. Driving ranges are common venues used for such practice. At typical driving ranges, golfers can practice their swing. Recently, businesses have begun to open more advanced driving ranges intended to cater to the golfers' desires for other forms of entertainment and recreation. Such facilities include not only the typical driving range, but also restaurants, bars, and other entertainment options with which the golfer may choose to supplement their practice round. On such option is the inclusion of various virtual games related to the golf swing, such as those disclosed in U.S. application Ser. No. 14/321,333, the disclosure of which is hereby incorporated by reference.

In parallel to the appearance of such new golfing/entertainment facilities, various technologies have been employed to assist golfers in improving their game or enhancing the typical practice round. Such technologies include using rf chips, radar, lasers, or optical cameras to track the golfer's swing and the flight path of the golf ball, and to provide the golfer with useful feedback regarding both. Unfortunately, while each such technology is well-suited for tracking particular parameters of the golf swing or path of the golf ball, none is capable of uninterrupted tracking and providing the golfer with a comprehensive view of their swing and the resulting golf shot.

Accordingly, there is a need for a system and method to utilize the parameters captured by each such technology across a plurality of sensors and presents the resulting information in a meaningful manner to the golfer.

Other advantages and features will be apparent from the following description and from the claims.

BRIEF SUMMARY OF THE INVENTION

In general, the invention relates to a computerized system and method of detecting and depicting a travel path of a golf ball hit from a hitting station in a plurality of hitting stations at a driving range. The computerized system and method utilizes a plurality of sensors to detect shot launch parameters from a first field of detection, shot trajectory parameters from a second field of detection, and/or ground path parameters from a third field of detection. Because the sensors may detect similar parameters from the overlapping fields of detection, the computerized system method determines which parameters should be utilized to calculate and depict the travel path of the golf ball on a display.

The invention relates to, in a first aspect, a computerized method of detecting and depicting a travel path of a golf ball hit from a hitting station in a plurality of hitting stations at a driving range. The computerized method pursuant to the first aspect includes: a. determining whether a first sensor detects a shot launch parameter associated with the travel path of the golf ball; b. determining whether a second sensor detects a shot trajectory parameter associated with the travel path of the golf ball; c. if the shot trajectory parameter was not detected by the second sensor, depicting on a display in electronic communication with the computer the travel path of the golf ball using the shot launch parameter; and d. if the shot launch parameter was detected by the first sensor and the shot trajectory parameter was detected by the second sensor, depicting on the display in electronic communication with the computer the travel path of the golf ball using the shot launch parameter and the shot trajectory parameter. The first sensor is in electronic communication with a computer having a processor, and the first sensor has a first sensor type. The second sensor is in electronic communication with the computer, and the second sensor has a second sensor type.

The computerized method may also include transmitting the shot launch parameter from the first sensor to the computer, and transmitting the shot trajectory parameter from the second sensor to the computer. The computerized method can also include determining if the first sensor is in electronic communication with the computer, and if the first sensor is in electronic communication with the computer, proceeding to step b. noted above. If the first sensor is not in electronic communication with the computer, the method detects the shot trajectory parameter associated with the travel path of the golf ball using the second sensor, and if the shot trajectory parameter was detected by the second sensor, depicting on the display in electronic communication with the computer the travel path of the golf ball using the shot trajectory parameter.

Moreover, the computerized method can include calculating an estimated travel path of the golf ball hit from the hitting station at the driving range using the shot launch parameter detected from the first sensor and depicting on the display in electronic communication with the computer the estimated travel path calculated using the shot launch parameter. Additionally, the computerized method can include calculating an estimated travel path of the golf ball hit from the hitting station at the driving range using the shot launch parameter detected from the first sensor and the shot trajectory parameter detected from the second sensor, and depicting on the display in electronic communication with the computer the estimated travel path calculated using the shot launch parameter and the shot trajectory parameter The computerized method may also include calculating, using the computer, the travel path of the golf ball using the shot launch parameter detected by the first sensor and the shot trajectory parameter detected by the second sensor when the first sensor detects the shot launch parameter and the second sensor detects the shot trajectory parameter. The computerized method can also include calculating, using the computer, the travel path of the golf ball using the shot launch parameter detected by the first sensor when the second sensor does not detect the shot trajectory parameter, and/or calculating, using the computer, the travel path of the golf ball using the shot trajectory parameter detected by the second sensor when the first sensor is not in electronic communication with a computer.

In general, in a second aspect, the invention relates to a computerized method of detecting and depicting a travel path of a golf ball hit from a hitting station in a plurality of hitting stations at a driving range. The computerized method pursuant to the second aspect includes first determining whether a first sensor is in electronic communication with a computer having a processor. If the first sensor is not in electronic communication with the computer, the computerized method includes: i. detecting a shot trajectory parameter associated with the travel path of the golf ball using a second sensor; ii. transmitting the shot trajectory parameter from the second sensor to the computer; iii. calculating, using the computer, the travel path of the golf ball using the shot trajectory parameter detected by the second sensor; and iv. depicting on a display in electronic communication with the computer the travel path of the golf ball using the shot trajectory parameter. If the first sensor is in electronic communication with the computer, the computerized method includes: i. detecting a moment of impact of the golf ball hit from the hitting station using the first sensor; ii. transmitting the shot launch parameter from the first sensor to the computer; iii. detecting the shot trajectory parameter associated with the travel path of the golf ball using the second sensor; and iv. transmitting the shot trajectory parameter from the second sensor to the computer. If the shot trajectory parameter was not detected by the second sensor, then the computerized method calculates, using the computer, the travel path of the golf ball using the shot launch parameter detected by the first sensor; and then depicts on the display in electronic communication with the computer the travel path of the golf ball calculated from the shot launch parameter. If the shot launch parameter was detected by the first sensor and the shot trajectory parameter was detected by the second sensor, the computerized method calculates, using the computer, the travel path of the golf ball using the shot launch parameter detected by the first sensor and the shot trajectory parameter detected by the second sensor, and then depicts on the display in electronic communication with the computer the travel path of the golf ball calculated from the shot launch parameter and the shot trajectory parameter.

Pursuant to either aspect of the invention, the first sensor may be configured to detect a first field of detection and may be positioned on opposing sides of the hitting station. The second sensor may be configured to detect a second field of detection, which overlaps the second field of detection, and the second sensor may be positioned adjacent to the driving range. The shot launch parameter may be golf ball data, club data or a combination thereof, such as club head path, club face angle, club head speed, launch angle, side spin, vertical spin, initial velocity or a combination thereof. Further, the computerized method can include determining whether a third sensor detects a ground path parameter associated with the travel path of the golf ball hit from the hitting station at the driving range, and transmitting the ground path parameter from the third sensor to the computer. The third sensor is configured to detect a third field of detection and may be positioned near an end of the driving range. The third field of detection overlaps with the second field of detection, and may also overlap with the first field of detection. The ground path parameter may be golf ball data after an impact point, such as speed, velocity, direction, friction or a combination thereof.

DETAILED DESCRIPTION OF THE INVENTION

Figure 1:
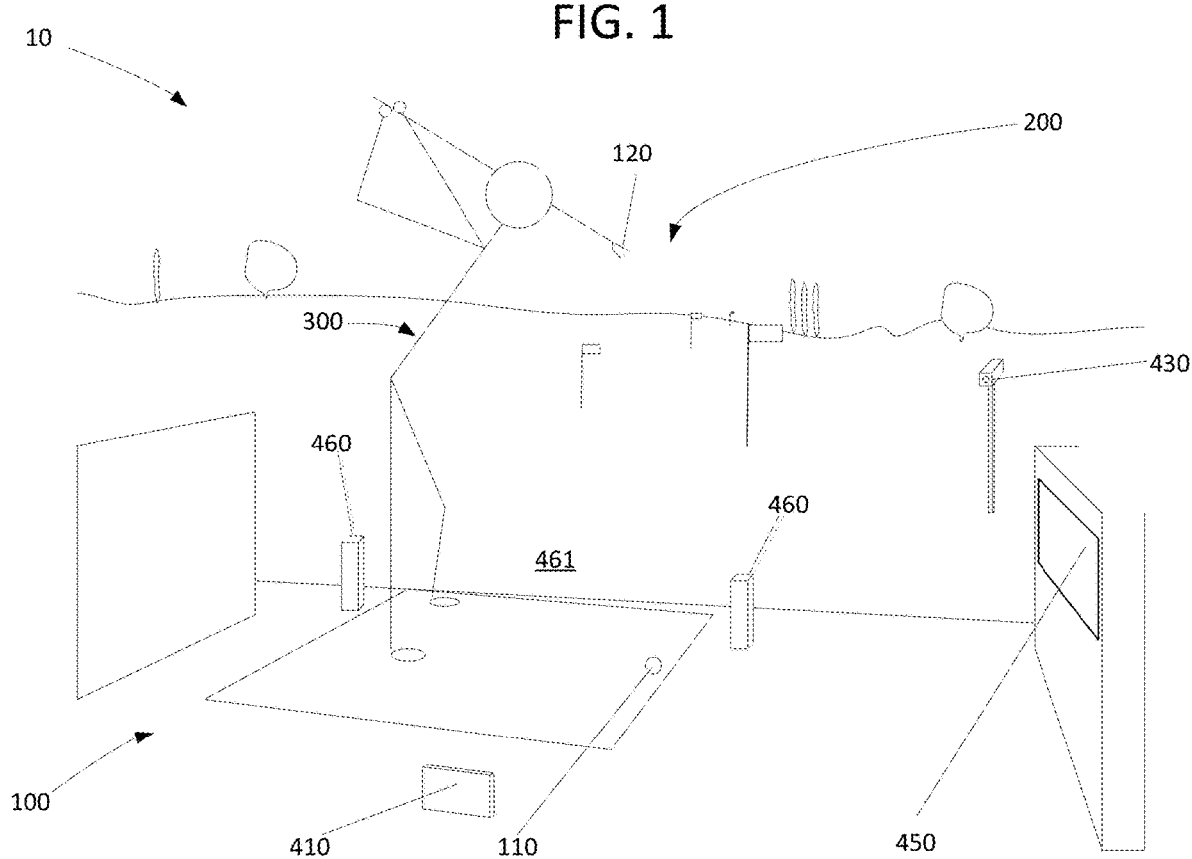
FIG. 1 shows a back perspective view of a first embodiment of a multiple sensor tracking system at a driving range.
Figure 2:
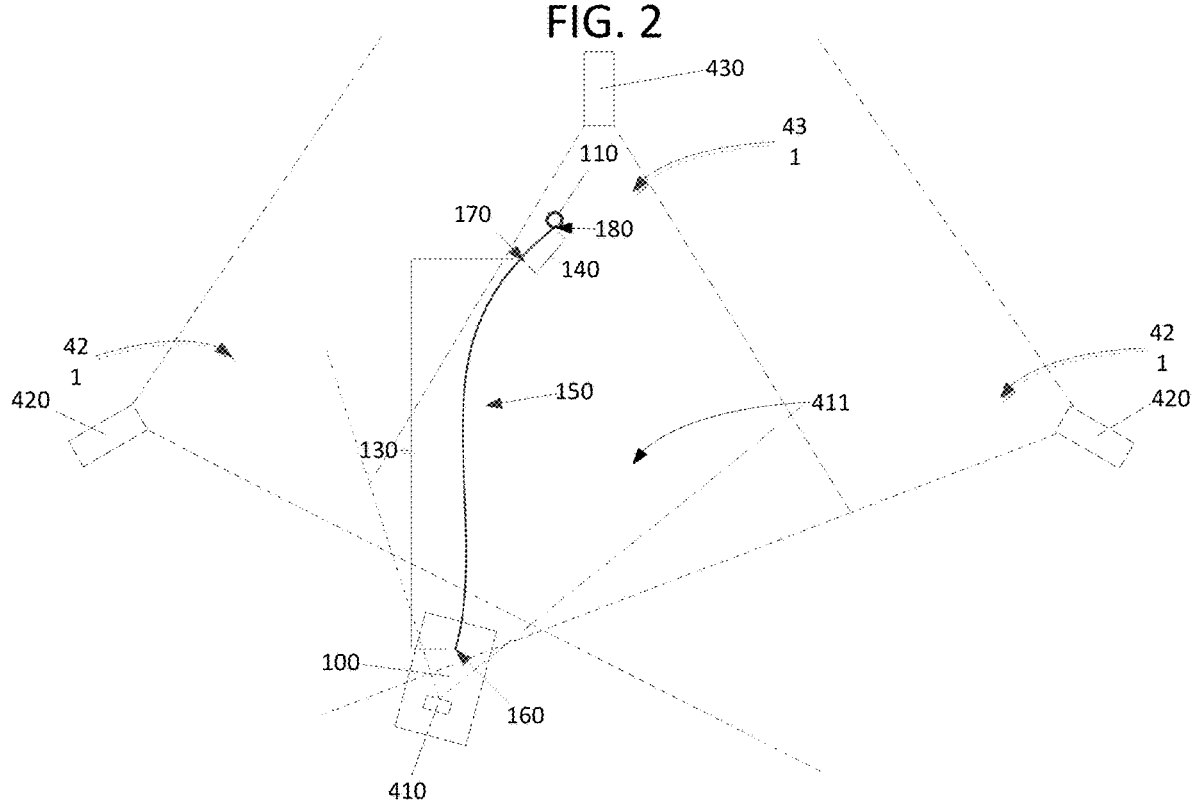
FIG. 2 shows an overhead view of a first embodiment of a multiple sensor tracking system at a driving range.
Figure 3:
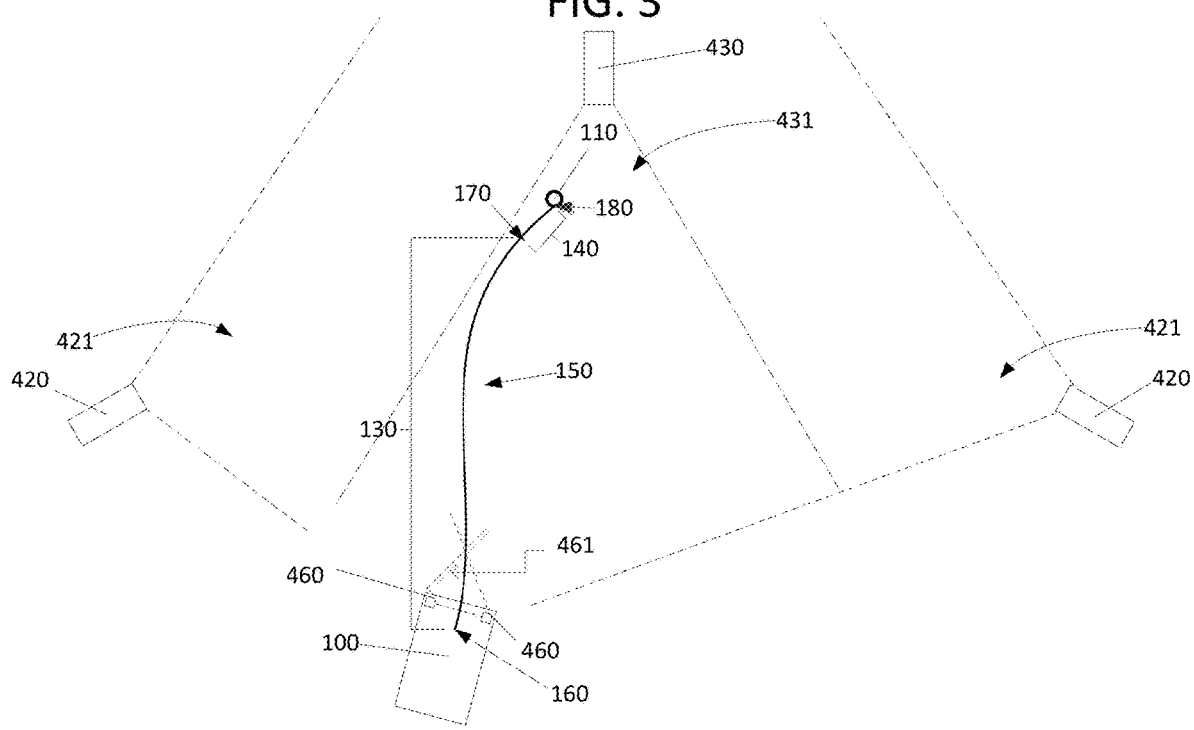
FIG. 3 shows an overhead view of a second embodiment of a multiple sensor tracking system at a driving range.

FIG. 1 shows a driving range 10 that includes at least one hitting station 100, at least one golf ball 110, at least one golf club 120, and a range surface 200. The hitting station 100 is positioned at one end of the range surface 200. It will be understood that a player 300 standing in the hitting station 100 may swing the golf club 120 to hit the golf ball 110 over and onto the range surface 200. Turning to FIG. 2, shown therein is the path that the golf ball 110 travels from the point of impact with the golf club 120 (referred to as the origination point 160) to the point that the golf ball 110 initially impacts the range surface 200 (referred to as the impact point 170). The path the golf ball 110 travel from the origination point 160 to the impact point 170 is referred to as the flight path 130. The path that the golf ball 110 travels from the impact point 170 to the point it comes to rest on the range surface 200 (referred to as the resting point 180) is referred to as the ground path 140. The total travel path 150 refers to the complete path that the golf ball 110 travels after the origination point 150 to the resting point 180, and is equivalent to the combination of the flight path 130 and the ground path 140. FIGS. 2 and 3 depict the flight path 130, ground path 140 and total travel path 150 of a golf ball 110.

Turning back to FIGS. 1 and 2, in accordance with an illustrative embodiment of the invention, a multiple sensor tracking system specially configured to track the total travel path 150 of the golf balls 110 used at a driving range 10 and to display that total travel path 150 to the player 300. The multiple sensor tracking system includes a plurality of sensors 410, 420, and 430, a display 450, and a computer having a processor and a database.

Each sensor in the plurality of sensors is configured to record certain parameters about the total travel path 150. Such parameters may include, without any limitation, the detection of the moment of impact, the origination point 150, the launch angle of the flight path 130, side spin of the golf ball 110, vertical spin of the golf ball 110, initial location of the golf ball 110, the impact point 160, speed/velocity of the golf ball 100 on the flight path 130, the three-dimensional coordinates of the flight path 130, the three-dimensional coordinates of the ground path 140, and the resting point 180. In addition, certain sensors may be configured to detect other parameters related to the golf swing of the player 300, including but not limited to the club path and the club speed/velocity.

It will be understood that by those skilled in the art that there are numerous types of sensors and technologies available for the detection of parameters, including for example and without limitation, infrared beam sensors, radar sensors, pressure sensors, sound sensors, laser sensors, and cameras (both infrared and visible light). It will be further understood that certain sensors are capable of detecting a subset of the total parameters available about the total travel path 150. For example, infrared beam sensors are particularly well-suited for detecting the moment of impact, but are not able to detect or otherwise determine the sidespin of the golf ball 110, the impact point 170, or other similar parameters. In contrast, sophisticated camera sensors are available that are well-suited to determine the parameters related to the flight path 130, such as direction, speed and the impact point 170, but are not as accurate at determining parameters associated with the ground path 140, such as the resting point 180. By way of further example, radar sensors are particularly well suited to detect the side spin and vertical spin of the golf ball 110 on the initial flight path 130, as well as the club path and club head speed, but unable to determine parameters associated with the ground path 140.

In addition to being configured to detect certain parameters, each sensor type also has a field of detection. The field of detection is the general area in front of the sensor from which the sensor can detect parameters. It will be understood that the field of detection can be adjusted for each sensor type, but may be restrained by the particular technology used to detect parameters. Furthermore, the position of each sensor may affect its field of detection. For example, FIG. 2 depicts a sensor 410 positioned in the back of a hitting station 100, with a field of detection 411. In such a position, the view of the flight path 130 by sensor 410 can be obscured by the golfer, or the divisions between each of the hitting stations 100. Such obstructions often adversely impact a sensor's ability to detect parameters.

A key improvement of the invention is the placement of other sensors in the plurality of sensors such that their respective fields of detection 411, 421, and 431 are not similarly obstructed. It will be therefore understood that such placements can thereby ensure a high probability that the combined fields of detection 411, 421, and 431 provide for an uninterrupted view of the total travel path (150). For example, in the exemplary embodiment depicted in FIG. 2, the fields of detection 411, 421 and 431 for each of the sensors 410, 420 and 430 respectively are shown to overlap, yet cover different areas where the golf ball 110 might travel on the total travel path 150.

Figure 4:
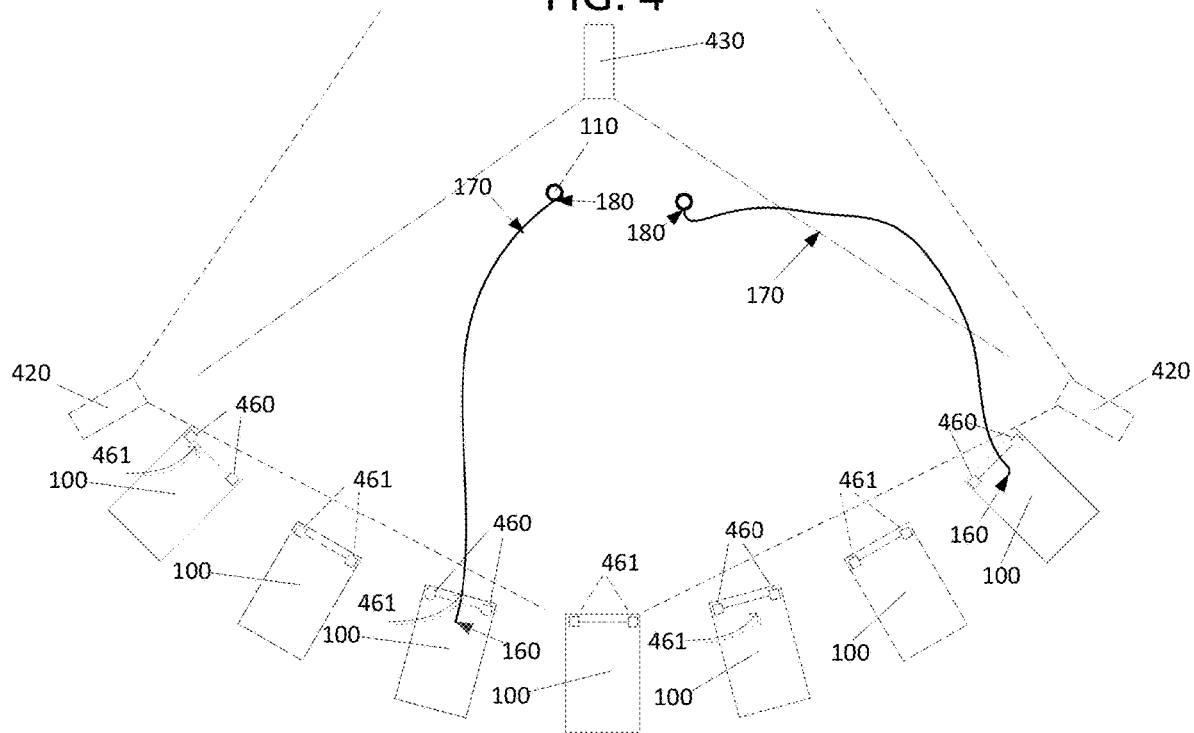
FIG. 4 shows an overhead view of a second embodiment of a multiple sensor tracking system with a plurality of hitting stations.

It will be understood that numerous embodiments of the multiple-sensor tracking system are possible by including different types of sensors 410, 420, 430 in the plurality of sensors, and positioning those sensors at different places within the driving range 10. FIG. 2 depicts one such embodiment. It will be further understood that a driving range 10 may include a plurality of hitting stations 100 arranged in a curve around an end of the range surface 200, as depicted in FIG. 4. A first-type sensor 410 is positioned at the back of each of the hitting stations 100. In this embodiment, first-type sensor 410 uses radar to detect club path, club face angle, launch angle, side spin, vertical spin and initial velocity. A second-type sensor 430 is positioned at another end of the range surface 200, and is generally positioned to face a plurality of hitting stations 110, as shown in FIG. 4. The second-type sensor 430 has a narrower field of detection 431 and is thus used to detect parameters related to the ground path 140. In this embodiment, the second-type sensor uses narrow-angle cameras to detect the three-dimensional coordinates of the ground path 140 and the speed/velocity of the golf ball 110. It will be understood that while only one sensor 430 is depicted in this embodiment, several second-type sensors 430 could be used in combination to detect parameters for ground paths 150 that occur in different places on the range surface 200.

In the depicted embodiment, two third-type sensors 430 are positioned at opposite ends of the plurality of hitting stations 100. The third-type sensors are configured to face inwards towards the range surface 200 and have overlapping fields of detection 421. Such overlapping fields of detections 421 are either necessary for certain types of sensors, or can be optionally employed to improve the accuracy of the detected parameters.

Turning to FIGS. 3 and 4, depicted therein are alternate embodiments of the multiple-sensor tracking system wherein the first-type sensors 410 of the first embodiment depicted in FIGS. 1 and 2 have been replaced with a fourth-type sensor 460. It will be understood that in the depicted alternative embodiments, the fourth-type sensor 460 may be configured to be a simple infrared directional trip sensor. In such an embodiment, sensor 460 includes a beam emitter and a beam detector positioned on opposite sides of the hitting station 100. In the simplest embodiment, the beam emitted of sensor 460 sends an infrared light beam to the other side of the hitting station 100 where it is detected by the beam detector. It will be further understood that when the golf ball 110 is hit it will travel between the beam detector and the beam emitter of sensor 460, and will thereby interrupt the infrared light beam being detected by the beam detector. In this manner, sensor 460 is able to identify when the flight path 130 begins, but is unable to detect other more advanced parameters associated with the total travel path 150. The fourth-type sensor 460 may also be configured as a quadrascopic or stereoscopic high-speed camera sensor that not only identifies when the flight path 130 begins but also precisely captures and analyzes ball data and club head data at the moment of impact, such as side spin and vertical spin of the golf ball 110 on the initial flight path 130, as well as the club path and club head speed. In addition, the fourth-type sensor 460 can also provide an indication that the golf ball 110 is in play during usage, e.g., it crosses the threshold of the front of the hitting station 110 at a sufficient speed, or is issued to the player 300 from a dispenser (not shown), such that issuance from the dispenser is a measured by the system as an act and the golf ball 110 is thereafter considered "in play". In further regard to the later, the multi-sensor tracking system provides for distinct detection and tracking from each hitting station 100 based on whether the player 300 is issued the golf ball 110 in the first instance. If the hitting station 100 is issued the golf ball 110, the sensor 460 detects the moment of impact is considered detected, and therefore, the shot trajectory parameters of the golf ball 110 can be detected by the second-type sensor 420 (as detailed below with regards to FIG. 6).

The fourth-type sensor 460 is positioned on opposing lateral sides of the hitting station 110 and is configured to provide an unobstructed field of detection 461 of a moment of impact with the golf ball 110, including up to about 4 feet of the flight path 130. The field of detection 461 has an overlapping field of detection with the field of detection 421, which provides an unobstructed field of detection of at least a portion of the flight path 130 after the moment of impact with the golf ball 110. While both field of detection 421 and field of detection 461 have overlapping balls, neither is likely to have a complete view of the flight path 130 from the moment of impact with the club 120 to the golf ball 110 impacting the surface of the range surface 200. Utilizing the combined field of detection 421 and 461 (and 431), the multiple-sensor tracking system provides a complete and unobstructed field of detection of the entire travel path 130 of the golf ball 110, independent of possible obstructions of sensor 420 by the player 300 or the driving range facility, of the sensor 460 by the golf ball during club-ball impact, or of the sensor 430 by the golf ball-field impact.

The database of the computer stores all parameters necessary for the multiple-sensor tracking system, which may include the size, shape and location of the hitting station, the location of each of the sensors in the plurality of sensors, the parameters that each of the sensors in the plurality of sensors can detect, the location and boundaries of the range surface 200, and the number, expected distance and trajectory of shots hit with the selected golf club 120. Such parameters are retrieved by the processor as needed to operate the multiple-sensor tracking system.

Figure 5:
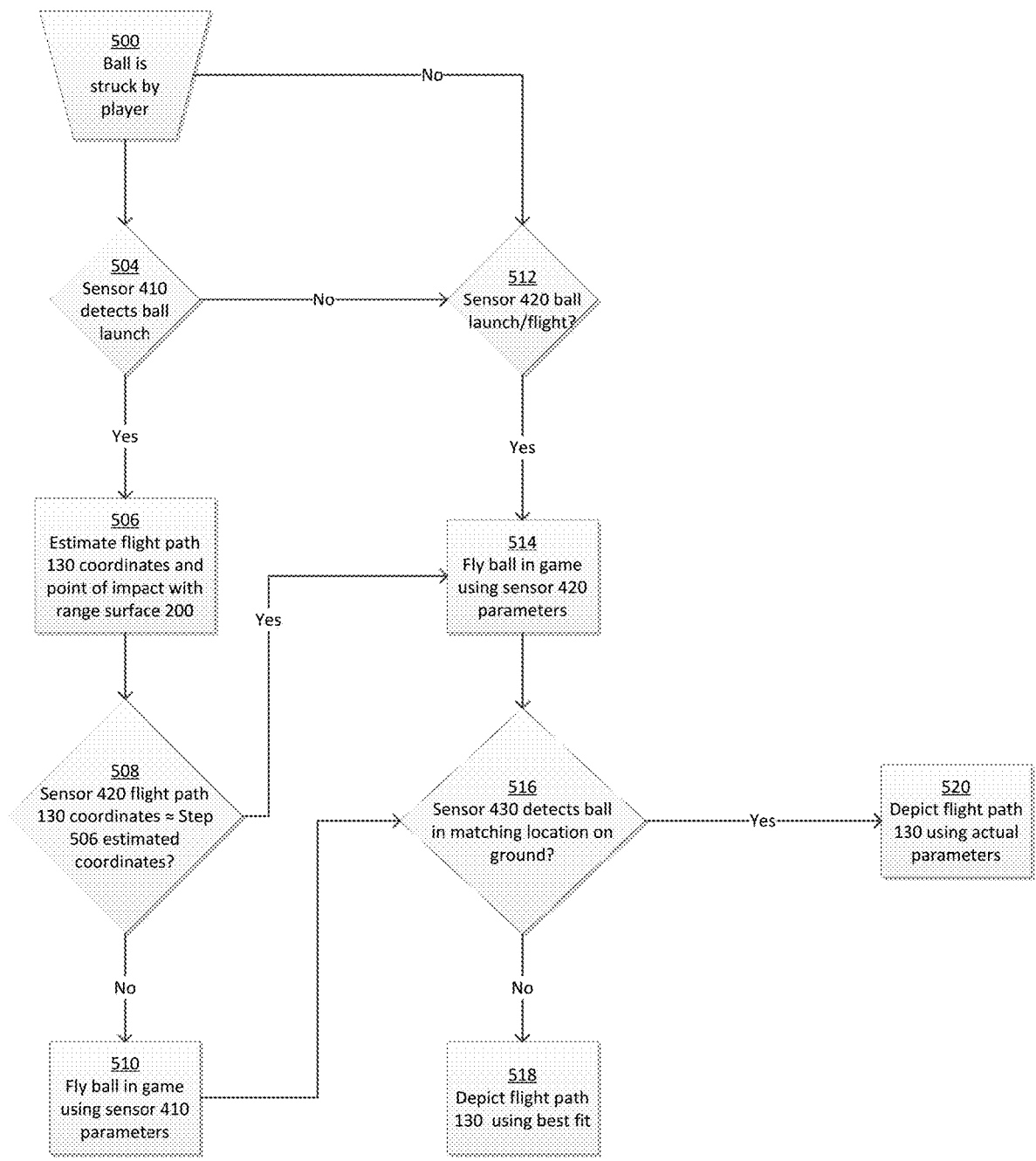
FIG. 5 is a flow chart depicting a method of determining which parameters should be used to depict a travel path.
Figure 6:
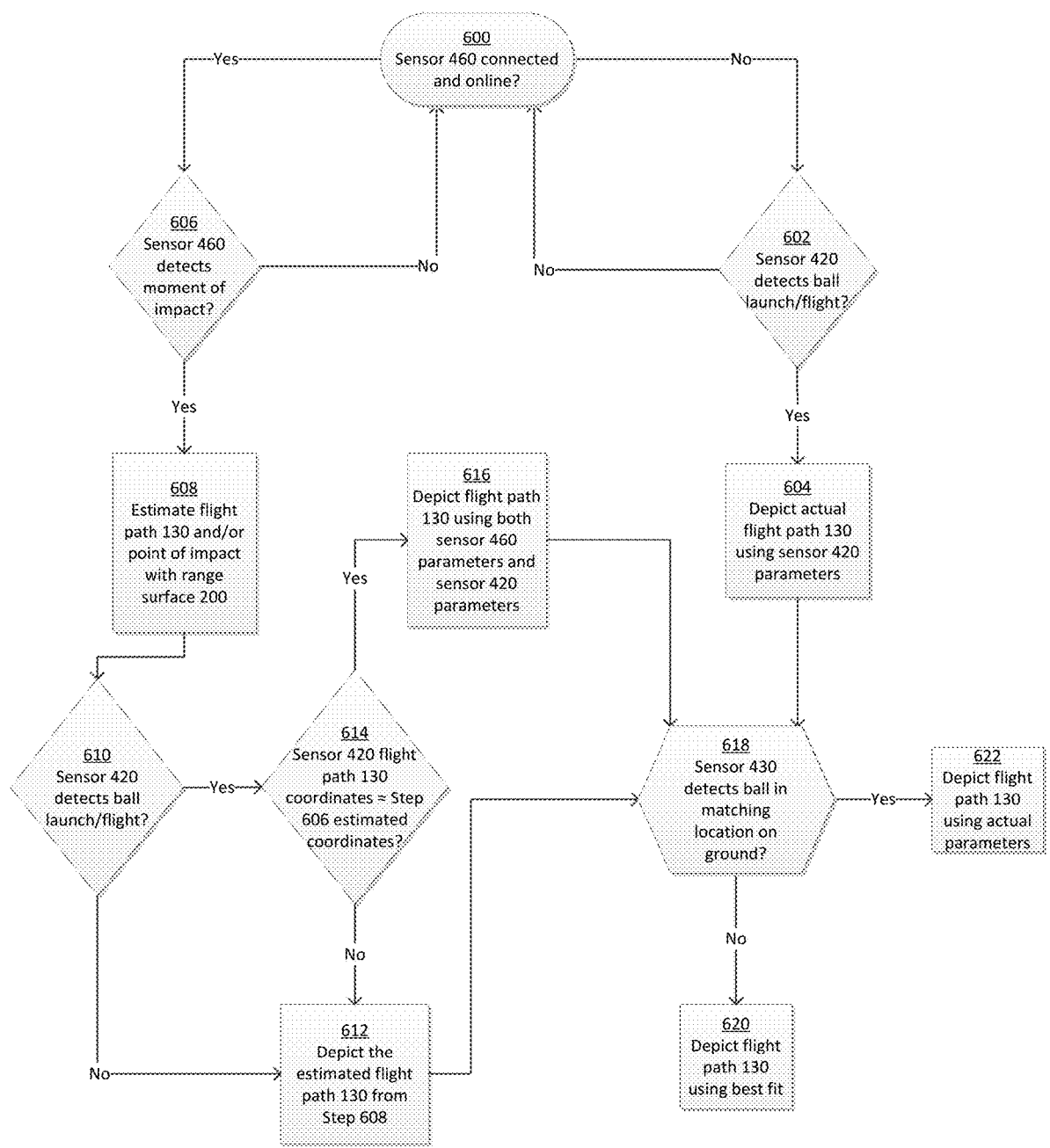
FIG. 6 is a flow chart depicting a method of determining which parameters should be used to depict a travel path.

It will be understood that by using multiple sensors 410, 420, and 430 (or alternatively 460, 420 and 430), the multiple-sensor tracking system is able to capture certain desired parameters of the total travel path 150. Because the sensors 410 or 460, 420 and 430 may detect the same parameters, a method is necessary to determine which parameters should be chosen to calculate and depict the total travel path 150 on the display 450. FIGS. 5 and 6 depict a method for making such determinations.

The method of FIG. 5 begins in step 500 when the golf ball 110 is struck by the golf club 120. The moment of impact is potentially detected by sensor 410 in step 504 (or alternatively by sensor 460 as described above). If sensor 410 detects the moment of impact, processing is transferred to step 506. In step 506, the computer uses the launch angle, initial velocity and origination position to estimate three-dimensional coordinates of the flight path 130 and an estimated impact point 170. In the first embodiment, the launch angle, initial velocity and origination position are all parameters that can be detected by sensor 410. Processing is then passed to step 508.

The purpose of step 508 is to determine if the sensors 420 have detected a golf shot that corresponds to the golf shot that was detected by the sensor 410 from step 504. This is done by comparing the estimated three-dimensional parameters from step 506 with the actual three-dimensional parameters detected by the sensors 420. It will be understood that in the typical driving range 10 there may be several different golf shots being tracked at any given time, such as those depicted in FIG. 4. In this embodiment, sensors 420 may detect actual three-dimensional parameters for many if not each flight path 130 associated with each such golf shot. Accordingly, in step 508, the computer first collects the actual three-dimensional parameters associated with each flight path 130 that was detected by sensors 420 during the time window when sensor 410 captured the parameters that were processed in step 506. The particular duration of the time window may depend on the types of sensors used, the weather conditions, the particular arrangement of the plurality of the hitting stations 100 on the driving range 10, the size and shape of the range surface, the positioning of the plurality of sensors, or any other condition that might effect the amount of time that a golf ball 110 could be expected to travel in each of the respective fields of detection 411, 421, 431. After capturing the actual three-dimensional parameters of the flight path 130 for the appropriate time window, the computer then compares such actual three-dimensional parameters for each flight path 130 with the estimated three-dimensional coordinates of flight path 130 and determines if any of the actual three-dimensional parameters correspond to the estimated three-dimensional parameters.

Such correspondence may be immediately apparent because the actual three-dimensional coordinates overlap a portion of the estimated three-dimensional coordinates. Alternatively, where the actual three-dimensional coordinates do not begin with actual origination position, the computer can calculate an estimated origination position 160 by extrapolating the three-dimensional parameters of the flight path 130 backwards. The estimated origination positions 160 (and actual origination positions 160 detected by the sensors 420 to the extent they exist) for each of the flight paths 130 are then compared to the actual origination position 160 detected by the sensor 410. If a corresponding actual/estimated origination position 160 detected by sensors 420 is found for the actual origination position 160 detected by sensor 410 is found, then processing proceeds to step 510. If no corresponding actual/estimated origination position 160 is detected by sensors 420, then processing proceeds to step 514.

In step 514 the flight path 130 is depicted on the display 450 using the three-dimensional parameters detected by sensor 420. In step 510 the flight path 130 is depicted on the display 450 using the three-dimensional parameters detected by sensor 410, or where sensor 410 did not detect three-dimensional parameters for the entire flight path 130, the computer will estimate any missing three-dimensional parameters by extrapolating the detected three-dimensional parameters along a parabolic curve.

Processing is then transferred to step 516 wherein sensor 430 potentially detects parameters associated with the ground path 140 of the golf ball 110. If sensor 430 detects parameters associated with the ground path 140, then in step 520, the total travel path 150 is depicted as continuing from the depicted flight path 130 using the parameters for the ground path 140 detected by sensor 430. It will be understood that in a typical driving range 10, sensor 430 may detect parameters for the ground path 140 of many different golf shots (as shown in FIG. 4). Accordingly, in step 516 the computer will attempt to align the parameters for the ground path 140 with the corresponding flight path 130. This is accomplished by taking the three-dimensional parameters used to depict the flight path 130 and calculating an estimated impact point 170. If sensor 430 detects parameters for the ground path 140 that correspond to the estimated point of impact, then processing proceeds to step 520. If sensor 430 does not detect parameters that correspond to the estimated impact point 170, then processing proceeds to step 518.

In step 518, the computer calculates parameters for the ground path 140 and depicts that ground path 130 on the display 450. This calculation is done by using the parameters used to depict the flight path 130, which may include an actual/estimated speed/velocity and direction as well as parameters that describe the effect of the friction between the range surface 200 and the golf ball 110. In step 520, the ground path 130 is depicted on the display 450 using the actual parameters for the ground path 130 that were detected by sensor 430.

If sensor 410 fails to detect the moment of impact in step 504, then processing moves to step 512 wherein sensor 420 potentially detects parameters associated with the flight path 130. If sensor 410 fails to detect the moment of impact, but sensor 420 detects parameters associated with the flight path 130, then processing is transferred to step 514. If sensor 410 fails to detect the moment of impact and sensor 420 fails to detect any parameters associated with the flight path 130, then processing returns back to step 500.

Turning now to the computerized method of FIG. 6, in step 600 with the system initially determines if sensor 460 positioned on opposite sides of the hitting station 100 is connected and online for the player 300. If sensor 460 is not connected and online for the player 300, the system in step 602 potentially allows all golf shot data from sensor 420 via step 604. In step 602, the sensors 420 potentially detect the actual three-dimensional parameters of a golf shot. If sensors 420 fail to detect the launch and/or flight of the golf shot in step 602, then processing returns to step 600. If the sensors 420 detect the launch and/or flight of the golf shot, then the flight path 130 is depicted on the display 450 using the three-dimensional parameters detected by sensor 420, and processing is then forwarded to step 618 wherein sensor 430 potentially detects parameters associated with the ground path 140 of the golf ball 110.

If the system determines that sensor 460 is connected and online for the player 300 in step 600, then when the golf ball 110 is struck by the golf club 120, the parameters associated with the moment of impact are potentially detected by sensor 460 in step 606. If sensor 460 fails to detect the moment of impact in step 606, then processing returns to step 600 even if sensor 420 detects parameters associated with the flight path 130. If sensor 460 detects the moment of impact, processing is transferred to step 608 wherein the computer uses the parameters detected by sensor 460 at the moment of impact (e.g., the club path, face angle and head speed, the golf ball 110 launch angle, side spin, vertical spin and/or initial velocity, or a combination of the ball data and club head data detected by sensor 460 at the moment of impact) to estimate three-dimensional coordinates of the flight path 130 and/or an estimated impact point 170 of the golf ball 110. Processing is then passed to step 610.

In step 610, like in step 602, the sensors 420 potentially detect the actual three-dimensional parameters of the golf shot. If sensors 420 fail to detect the launch and/or flight of the golf shot in step 610, then processing is passed to step 612 wherein the flight path 130 is depicted on the display 450 using the estimated three-dimensional coordinates from step 608. The computer may extrapolate the detected moment of impact parameters along a parabolic curve in order to estimate the flight path 130 and/or the estimated point of impact 170 of the golf ball. If the sensors 420 detect the launch and/or flight of the golf shot in step 610, then processing is then forwarded to step 614.

In step 614, the system determines if the sensors 420 have detected a golf shot that corresponds to the golf shot that was detected by the sensor 460 from step 606. This may be done by comparing the estimated three-dimensional parameters from step 608 with the actual three-dimensional parameters detected by the sensors 420 in step 610. It will be understood that in the typical driving range 10 there may be several different golf shots being tracked at any given time, such as those depicted in FIG. 4. Sensors 420 may detect actual three-dimensional parameters for many if not each flight path 130 associated with each such golf shot. Accordingly, in step 610, the computer first collects the actual three-dimensional parameters associated with each flight path 130 that was detected by sensors 420 during the time window when sensor 460 captured the parameters that were processed in step 606. As noted above, the particular duration of the time window may depend on the types of sensors used, the weather conditions, the particular arrangement of the plurality of the hitting stations 100 on the driving range 10, the size and shape of the range surface, the positioning of the plurality of sensors, or any other condition that might effect the amount of time that a golf ball 110 could be expected to travel in each of the respective fields of detection 411, 421, 431. After capturing the actual three-dimensional parameters of the flight path 130 for the appropriate time window, the computer then compares such actual three-dimensional parameters for each flight path 130 with the estimated three-dimensional coordinates of flight path 130 and determines if any of the actual three-dimensional parameters correspond to the estimated three-dimensional parameters.

Such correspondence may be immediately apparent because the actual three-dimensional coordinates overlap a portion of the estimated three-dimensional coordinates. Alternatively, where the actual three-dimensional coordinates do not begin with actual origination position, the computer can calculate an estimated origination position 160 by extrapolating the three-dimensional parameters of the flight path 130 backwards. The estimated origination positions 160 (and actual origination positions 160 detected by the sensors 420 to the extent they exist) for each of the flight paths 130 are then compared to the actual origination position 160 detected by the sensor 460. If no corresponding actual/estimated origination position 160 is detected by sensors 420, then processing proceeds to step 612 wherein the flight path 130 is depicted on the display 450 using the estimated three-dimensional coordinates from step 608. If a corresponding actual/estimated origination position 160 detected by sensors 420 is found for the actual origination position 160 detected by sensor 460 is found, then processing proceeds to step 616. In step 616 the flight path 130 is depicted on the display 450 using a combination of both the three-dimensional shot trajectory parameters detected by sensor 420 in step 610 and the shot launch parameters detected at the moment of impact by sensor 460 in step 606. In step 616, the computer will attempt to align the shot trajectory parameters detected by sensors 420 with the shot launch parameters detected by sensor 460.

Processing is then transferred to step 618 wherein sensor 430 potentially detects parameters associated with the ground path 140 of the golf ball 110. If sensor 430 detects parameters associated with the ground path 140, then in step 622, the total travel path 150 is depicted as continuing from the depicted flight path 130 using the parameters for the ground path 140 detected by sensor 430. It will be understood that in a typical driving range 10, sensor 430 may detect parameters for the ground path 140 of many different golf shots (as shown in FIG. 4). Accordingly, in step 620 the computer will attempt to align the parameters for the ground path 140 with the corresponding flight path 130. This is accomplished by taking the three-dimensional parameters used to depict the flight path 130 and calculating an estimated impact point 170. If sensor 430 detects parameters for the ground path 140 that correspond to the estimated point of impact, then processing proceeds to step 622. If sensor 430 does not detect parameters that correspond to the estimated impact point 170, then processing proceeds to step 620.

In step 620, the computer calculates parameters for the ground path 140 and depicts that ground path 130 on the display 450. This calculation is done by using the parameters used to depict the flight path 130, which may include an actual/estimated speed/velocity and direction as well as parameters that describe the effect of the friction between the range surface 200 and the golf ball 110. In step 622, the ground path 130 is depicted on the display 450 using the actual parameters for the ground path 130 that were detected by sensor 430.

It is to be understood that even though numerous characteristics and advantages of various embodiments of the invention have been set forth in the foregoing description, together with details of the structure and functions of various embodiments of the invention, this disclosure is illustrative only, and changes may be made in detail, especially in matters of structure and arrangement of parts within the principles of the invention to the full extent indicated by the broad general meaning of the terms in which the appended claims are expressed. It will be appreciated by those skilled in the art that the teachings of the invention can be applied to other systems without departing from the scope of the invention.

What is claimed is:

1. A computerized method of detecting and depicting a travel path of a golf ball hit from a hitting station in a plurality of hitting stations at a driving range, said computerized method comprising the steps of:
   a. electronically determining whether a first sensor detects a shot launch parameter associated with said travel path of said golf ball, wherein said first sensor is in electronic communication with a computer having a processor, wherein said first sensor has a first sensor type, wherein said shot launch parameter comprises golf ball data including initial velocity and launch angle and club data including club head speed;
   b. electronically determining whether a second sensor detects a shot trajectory parameter associated with said travel path of said golf ball, wherein said second sensor is in electronic communication with said computer, wherein said second sensor has a second sensor type;
   c. if said shot trajectory parameter was not detected by said second sensor, depicting on a display in electronic communication with said computer said travel path of said golf ball using said shot launch parameter, wherein the travel path is determined by calculating an estimated travel path of said golf ball hit from said hitting station at said driving range using said shot launch parameter detected from said first sensor, depicting on said display in electronic communication with said computer said estimated travel path calculated using said shot launch parameter;
   d. if said shot launch parameter was detected by said first sensor and said shot trajectory parameter was detected by said second sensor, determining if said shot launch parameter and said shot trajectory parameter correspond and if said shot launch parameter and said shot trajectory parameter correspond, depicting on said display in electronic communication with said computer said travel path of said golf ball using said shot launch parameter and said shot trajectory parameter wherein the travel path is determined by calculating an estimated travel path of said golf ball hit from said hitting station at said driving range using said shot launch parameter detected from said first sensor and said shot trajectory parameter detected from said second sensor, and depicting on said display in electronic communication with said computer said estimated travel path calculated using said shot launch parameter and said shot trajectory parameter; and
   wherein if said shot launch parameter is not detected by said first sensor and said first sensor is online, said travel path of said golf ball is not depicted on said display.

2. The computerized method of claim 1 wherein said first sensor is configured to detect a first field of detection, and wherein said second sensor is configured to detect a second field of detection that overlaps with said first field of detection.

3. The computerized method of claim 1 wherein said step a. further comprises the step of transmitting said shot launch parameter from said first sensor to said computer, and wherein said step b. further comprises the step of transmitting said shot trajectory parameter from said second sensor to said computer.

4. The computerized method of claim 1 wherein said step a. further comprises the steps of:
   determining if said first sensor is in electronic communication with said computer;
   if said first sensor is in electronic communication with said computer, proceeding to said step b.;
   if said first sensor is not in electronic communication with said computer, detecting said shot trajectory parameter associated with said travel path of said golf ball using said second sensor; and
   if said shot trajectory parameter was detected by said second sensor, depicting on said display in electronic communication with said computer said travel path of said golf ball using said shot trajectory parameter.

5. The computerized method of claim 1 wherein said club data further comprises club head path, club face angle or a combination thereof.

6. The computerized method of claim 1 wherein said golf ball data further comprises side spin, vertical spin, or a combination thereof.

7. The computerized method of claim 1 further comprising the step of determining whether a third sensor detects a ground path parameter associated with said travel path of said golf ball hit from said hitting station at said driving range.

8. The computerized method of claim 7 further comprising the step of transmitting said ground path parameter from said third sensor to said computer.

9. The computerized method of claim 7 wherein said third sensor is configured to detect a third field of detection that overlaps with a second field of detection detected by said second sensor.

10. The computerized method of claim 7 wherein said ground path parameter comprises golf ball data after an impact point.

11. The computerized method of claim 10 wherein said golf ball data after said impact point comprises speed, velocity, direction, friction or a combination thereof.

12. The computerized method of claim 1 further comprising the step of calculating, using said computer, said travel path of said golf ball using said shot launch parameter detected by said first sensor and said shot trajectory parameter detected by said second sensor when said first sensor detects said shot launch parameter and said second sensor detects said shot trajectory parameter.

13. The computerized method of claim 1 further comprising the step of calculating, using said computer, said travel path of said golf ball using said shot launch parameter detected by said first sensor when said second sensor does not detect said shot trajectory parameter.

14. The computerized method of claim 1 further comprising the step of calculating, using said computer, said travel path of said golf ball using said shot trajectory parameter detected by said second sensor when said first sensor is not in electronic communication with said computer.

15. A computerized method of detecting and depicting a travel path of a golf ball hit from a hitting station in a plurality of hitting stations at a driving range, said computerized method comprising the steps of:
   a. determining whether a first sensor is in electronic communication with a computer having a processor;
   b. if said first sensor is not in electronic communication with said computer, the computerized method further comprises the steps of:
      i. detecting a shot trajectory parameter associated with said travel path of said golf ball using a second sensor, wherein said second sensor is in electronic communication with said computer;

ii. transmitting said shot trajectory parameter from said second sensor to said computer;
iii. calculating, using said computer, said travel path of said golf ball using said shot trajectory parameter detected by said second sensor; and
iv. depicting on a display in electronic communication with said computer said travel path of said golf ball using said shot trajectory parameter;

c. if said first sensor is in electronic communication with said computer, the computerized method further comprises the steps of:
i. detecting a shot launch parameter of said golf ball hit from said hitting station using said first sensor, wherein said shot launch parameter comprises golf ball data including golf ball initial velocity and golf ball launch angle and club data including club head speed;
ii. transmitting said shot launch parameter from said first sensor to said computer;
iii. detecting said shot trajectory parameter associated with said travel path of said golf ball using said second sensor;
iv. transmitting said shot trajectory parameter from said second sensor to said computer;
v. if said shot trajectory parameter was not detected by said second sensor, further comprising the steps of:
calculating, using said computer, said travel path of said golf ball using said shot launch parameter detected by said first sensor; and
depicting on said display in electronic communication with said computer said travel path of said golf ball calculated from said shot launch parameter; and
vi. if said shot launch parameter was detected by said first sensor and said shot trajectory parameter was detected by said second sensor,
calculating, using said computer, said travel path of said golf ball using said shot launch parameter detected by said first sensor and said shot trajectory parameter detected by said second sensor;
determining if said shot launch parameter and said shot trajectory parameter correspond; and
if said shot launch parameter and said shot trajectory parameter correspond depicting on said display in electronic communication with said computer said travel path of said golf ball calculated from said shot launch parameter and said shot trajectory parameter; and
vii. if said shot launch parameter is not detected by said first sensor and said first sensor is online, said travel path of said golf ball is not depicted on said display.

16. The computerized method of claim 15 wherein said first sensor is configured to detect a first field of detection about said hitting station, wherein said first sensor has a first sensor type, wherein said second sensor is configured to detect a second field of detection about said driving range, and wherein said second sensor has a second sensor type.

17. The computerized method of claim 15 wherein said club data further comprises club head path, club face angle, or a combination thereof, and wherein said golf ball data further comprises golf ball side spin, golf ball vertical spin, or a combination thereof.

18. The computerized method of claim 16 further comprising the steps of:
detecting a ground path parameter associated with said travel path of said golf ball hit from said hitting station at said driving range using a third sensor;
transmitting said ground path parameter from said third sensor to said computer.

19. The computerized method of claim 18 wherein said third sensor is configured to detect a third field of detection that overlaps with said second field of detection.

20. The computerized method of claim 18 wherein said ground path parameter comprises golf ball data after an impact point.

21. The computerized method of claim 20 wherein said golf ball data after said impact point comprises speed, velocity, direction, friction or a combination thereof.

* * * * *